Oct. 21, 1941.  A. W. KAISER ET AL  2,260,032
SEAT CONSTRUCTION
Filed Feb. 27, 1939    2 Sheets-Sheet 1
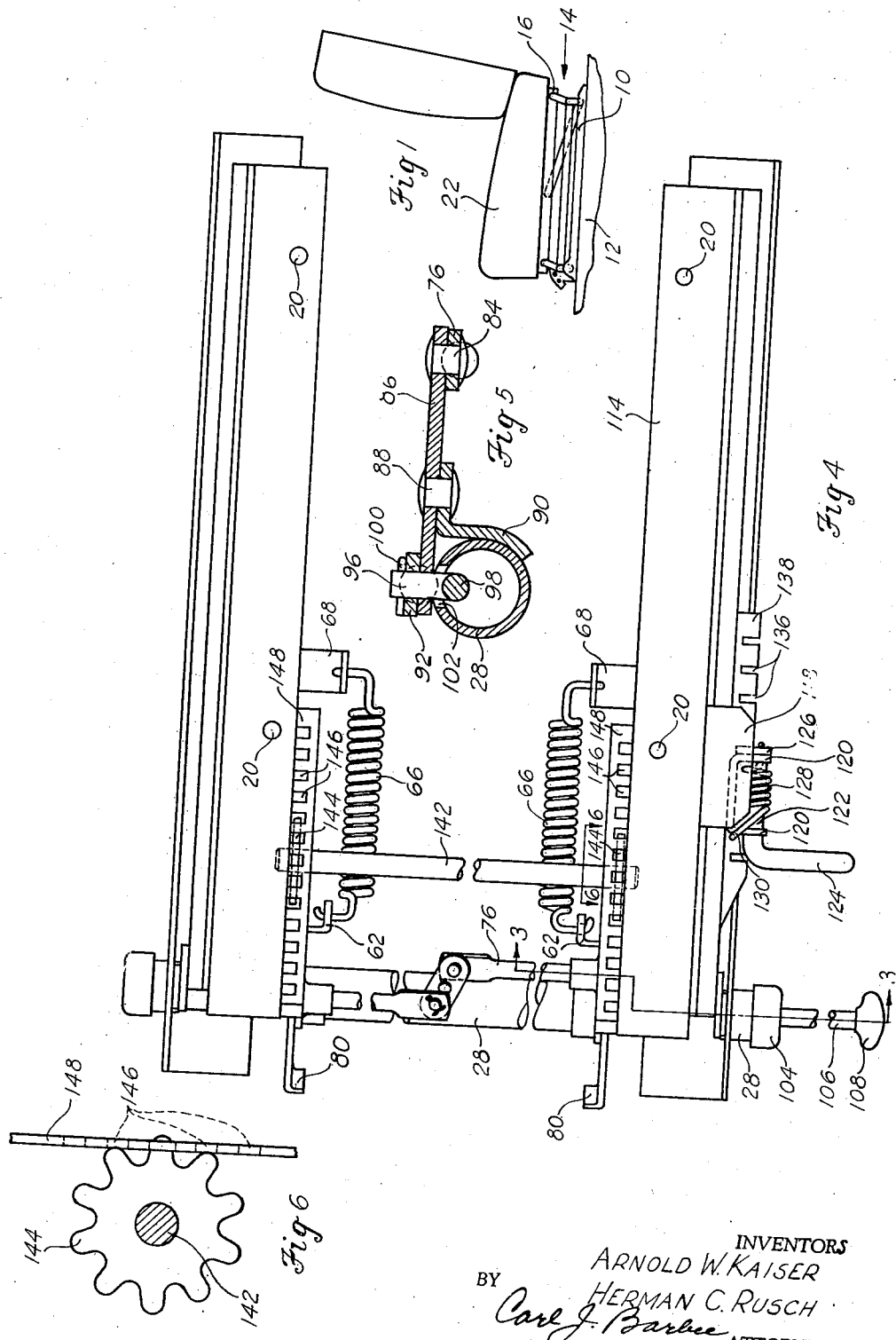
INVENTORS
ARNOLD W. KAISER
HERMAN C. RUSCH
BY Carl J. Barbee
ATTORNEY.

Oct. 21, 1941.  A. W. KAISER ET AL  2,260,032
SEAT CONSTRUCTION
Filed Feb. 27, 1939   2 Sheets-Sheet 2
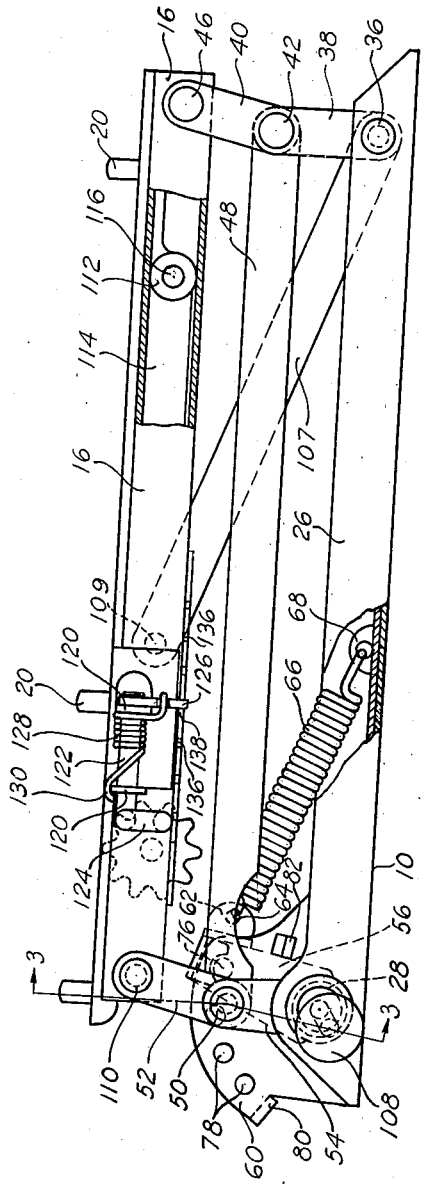
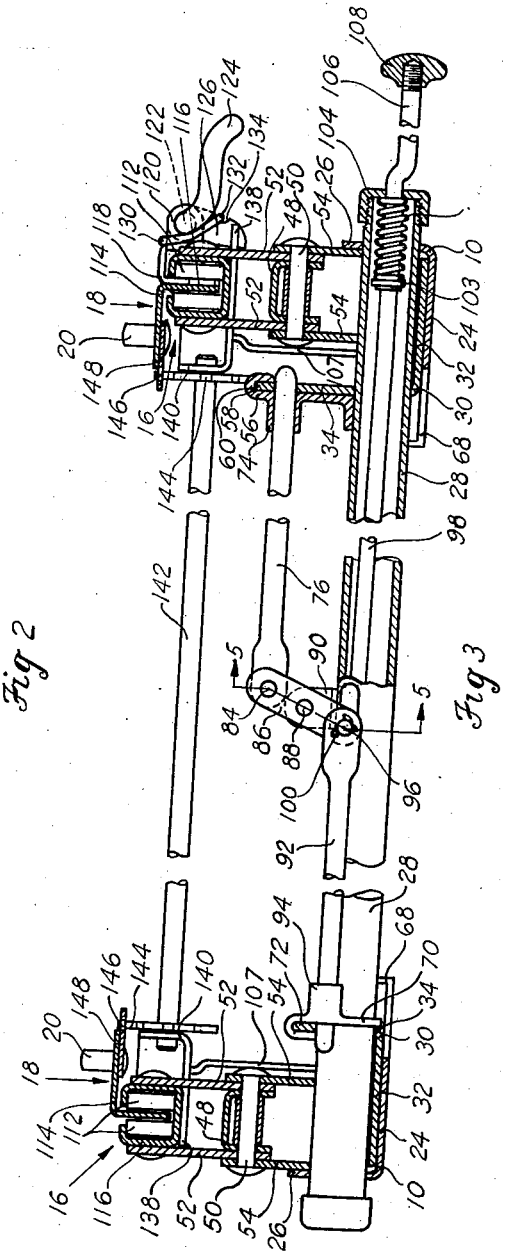
INVENTORS
ARNOLD W. KAISER
HERMAN C. RUSCH
BY Carl J. Barbee
ATTORNEY.

Patented Oct. 21, 1941

2,260,032

UNITED STATES PATENT OFFICE 2,260,032

SEAT CONSTRUCTION

Arnold W. Kaiser and Herman C. Rusch, Milwaukee, Wis., assignors to Nash-Kelvinator Corporation, Kenosha, Wis., a corporation of Maryland Application February 27, 1939, Serial No. 258,604

7 Claims. (Cl. 155—14)

This invention relates to seat construction and has particular reference to an adjustable driver's seat construction for automotive vehicles.

As a general rule driver's seats may only be adjusted forwardly or rearwardly so that the vehicle may be driven by either short or long legged persons, the adjustment placing the operator of the vehicle either closer to or farther away from the operating pedals. It was recognized at an early date that an adjustment which maintained the seat in the same vertical position with respect to the floor and the pedals of the vehicle was not the solution to the entire problem, and it was also recognized that a short legged individual was also quite apt to be short in the torso and would usually require being seated upon a higher level within the vehicle than a longer legged person whose torso would be proportionately longer.

Accordingly, most present day driver's seats are constructed with an adjustment which, as the seat is adjusted into a forward position closer to the pedals, also raises the seat to elevate the driver within the vehicle. The converse of this is also true, that is, that the rearward adjustment acts concurrently to lower the seat within the vehicle.

While this type of seat adjuster is successful in the majority of cases inasmuch as the conditions outlined above are usually true, still there are a considerable number of individuals to whom such seat adjustments are not suited. The human body takes a variety of shapes and sizes, and it is not at all uncommon to encounter long legged individuals who are very short in the torso or short legged individuals who are long in the torso. The type of seat adjustment described above makes no provision for the adjustment of a driver's seat to the needs of these types of human beings.

It is accordingly an object of the invention to provide a seat adjustment which may be operated to orient the seat to accommodate the needs of all normal able-bodied individuals.

A further object of the invention is to provide an adjuster for the driver's seat of an automotive vehicle which permits adjustment of the seat both forwardly and rearwardly, and in a vertical direction at any point in its forward and rearward adjustment.

An additional object of the invention is to provide a seat adjuster in which adjustment both longitudinally of the seat and vertically may be readily made while an individual is seated thereon.

A still further object of the invention is to provide means whereby the adjustment of a seat may be accomplished by instrumentalities under the control of a person seated upon the driver's portion thereof.

Additional objects and advantages will appear hereinafter as the description proceeds and will be pointed out more fully in connection with the appended claims.

In the drawings, of which there are two sheets, and which are to be taken as illustrative rather than as limiting the invention:

Figure 1 is a side elevational view of the device of the present invention shown applied to a seat for an automotive vehicle;

Figure 2 is an enlarged elevational view similar to Figure 1 but showing only the adjusting mechanism, certain parts being broken away more clearly to show the invention;

Figure 3 is a vertical transverse sectional view through the mechanism shown in Figure 2 taken substantially upon planes as indicated by the broken lines 3—3 of Figure 2 and Figure 4 looking in the direction of the arrows;

Figure 4 is a plan view of the seat adjusting mechanism shown in Figures 2 and 3;

Figure 5 is a sectional view through a portion of the locking mechanism for the seat adjuster taken substantially upon planes as indicated by the broken line 5—5 of Figure 3; and Figure 6 is a detail sectional view of a pinion and cooperating rack taken substantially upon a plane as indicated by the line 6—6 of Figure 4 looking in the direction of the arrows.

Referring more specifically to the drawings in which similar reference characters are employed throughout to designate similar parts, the device is illustrated as comprising a base plate 10 of which two are provided and which may be secured by any suitable means to the floor 12 of an automotive vehicle. An elevating mechanism designated generally at 14 (Figure 1) supports a guide 16 for a carriage 18 (see Figure 3), which is in turn secured by fasteners 20 to the underside of a seat construction 22 of any desired type.

Referring to the base plates 10 it will be recognized from Figures 2 and 3 that such base plates comprise two angle irons located at opposite sides of the seat, such angle irons having one web 24 positioned upon and secured to the floor 12 of the vehicle and the other web 26 extending upwardly along the outside of the adjusting mechanism to provide hinge anchors as will be described hereinafter.

From Figure 2 it will be recognized that the side webs 26 have a substantially uniform width throughout their lengths except adjacent the front portion of the seat where the side webs 26 are extended to provide a bearing for receiving a tube 28, the function of which will be described hereinafter. Similar angle irons 30 having bottom legs 32 welded to the upper surface of the legs 24 have the same extent as the leg 24. The upstanding webs 34 of the angles 30 are positioned to face the upstanding webs 26 of the angles 10 but in spaced relation with respect thereto.

The webs 26 and 34 are apertured toward their rear ends to receive a pin 36, the ends of which are headed to retain the same in position. Pin 36 provides a bearing for receiving a pair of links 38 which are spaced apart by any suitable type of washer. The upper ends of the links 38 are connected to one another and to another set of links 40 by means of a pin 42. The upper ends of links 40 are connected to a carriage support 16 by means of a pin 46. Although this linkage is described only in connection with the left side of the device (which is on the right as viewed in Figure 3), it will be understood that the right side is identically constructed.

The pin 42 forms the knee of a toggle mechanism composed of the links 38 and 40, and this knee of the toggle mechanism has connected thereto a longitudinally extending link 48 which is connected to a similar pin 50 at the forward portion of the device forming the knee of a similar toggle mechanism 52, 54. The lower portion of the lower links 54 of the forward toggle 52, 54 are secured by any suitable means such as welding to the tube 28 which extends transversely of the mechanism at the forward end thereof and which is mounted for rotational movement in bearings formed by the upstanding webs 26 and 34 of the angle irons 10 and 30. It will be recognized that rotation of the tube 28 will tend to straighten or break the toggles 38, 40 and 52, 54 in unison by reason of the connecting link 48 extending between the knees 42 and 50 of the toggles. These links 48 and the links 107 hereinafter described serve to maintain the seat in a level condition at all times.

The tube 28 also has welded thereto a bracket 56 for rotation therewith, said bracket 56 having an overturned upper edge 58 for cooperation with a segment 60 formed upon the upstanding web 34 of the angle 30. A lug 62 formed upon a rear portion of the bracket 56 is apertured as at 64 to provide an anchor for one end of a tension spring 66 which has its other end anchored in an aperture in a lug 68 secured to the channel member 10. Spring 66 has a tendency constantly to rotate the tube 28 in a clockwise direction, as viewed in Figure 2, to move the toggles 52, 54 and 38, 40 toward their straightened position.

A bracket 70 similar to bracket 56 is provided upon the opposite end of the tube 28 and is secured thereto. Bracket 70 has a smaller operating radius and is therefore adapted to cooperate with a segment 72 of smaller radius.

The bracket 56 is provided with an extended hollow boss 74 for slidably receiving a pin 76. Pin 76 is adapted to project through the bracket 56 and engage in apertures 78 (see Figure 2) arcuately positioned upon the segment 60. Segment 60 is also provided with stops 80 and 82 formed by portions bent from the segment 60 in the direction of the bracket 56.

The opposite end of the pin 76 is flattened and pivoted at 84 to a lever 86 fulcrumed at 88 to a bracket 90 secured to a central portion of the tube 28 as by welding. The lower end of the lever 86 is pivoted to the flattened end of a similar pin 92 which has an end extending through a hollow boss 94 in the bracket 70 for cooperation with arcuately arranged apertures (not shown) in the smaller segment 72. The connection between the lever 86 and the flattened end of pin 92 is effected by means of a bent end 96 upon a rod 98, a cotter pin 100 being employed to hold the parts 92 and 86 in position upon the bent end 96 of the rod 98 (see also Figure 5).

The rod 98 extends longitudinally of the tube 28 and the bent end 96 emerges from the tube through a slot 102 formed therein opposite the bracket 90. The opposite end of the rod 98 extends through a central aperture in a cap 104 threaded on the end of the tube 28 and terminates in a downwardly and forwardly bent portion 106 provided with a manipulating knob 108. A spring 101 may encircle rod 98 and be confined between cap 104 and a washer 103 held in place on the rod by any desired means. A similar arrangement may be provided at the opposite end of tube 28.

When it is desired to change the elevation of the seat and assuming that the seat is in its raised position as shown in Figures 2 and 3, it is necessary for the seat occupant to pull the knob 108 to the right, as viewed in Figure 3, thus retracting the pins 76 and 92 from engagement with the apertures formed in their respective cooperating segments 60 and 72. The seat will remain in its elevated position until a downward force (such as the weight of the occupant) is applied thereto, thus overcoming the tendency of the spring 66 to straighten the knee of the toggles 52, 54 and 38, 40. It will be noticed that the toggles never reach a dead center or straightened position but simply approach such position, and it is, therefore, possible by the application of force downwardly upon the seat to break the toggles and lower the seat. The stop 82 prevents the complete straightening movement of the toggles and the stop 80 limits the downward movement of the seat. The downward movement is, of course, cushioned by the springs 66.

The carriage 16 is constrained for movement in the arc of a long radius circle by means of links 107 which have their lower ends pivoted upon the pins 36 at the rear of the supports 26, and their upper ends pivoted by means of pins 109 to the carriage guides 16. It will be understood that the links 107 are positioned one on each side of the mechanism and that they will prevent movement of the carriage guide 16 longitudinally of the device about the pivots 42 and 50 forming the knees of the toggle. Although the vertical movement of the carriage guide 16 will lie along the arc of a circle having a radius equal to the length of the links 107, this movement will be substantially vertical.

It will also be understood that when the vertical adjustment of the carriage 16 has been accomplished to provide the seat level desired, it is necessary to project the pins 76 and 92 into their apertures in the segments 60 and 72 moving the rod 98 toward the left as viewed in Figure 3. This movement is shown as effected by the spring 101, although this could be omitted and the pins projected by pushing the knob 108 toward the mechanism.

The upper ends of the links 40 and 52 are connected to the carriage support and guide 16 by means of hinge pins 46 and 110 extending through guide 16. The guide 16 comprises a channel which has inturned upper ends for overlying the channel and providing an upper retainer for a pair of rollers 112 positioned upon opposite sides of a web 114 for supporting the seat and secured thereto by means of a pin 116 about which they are rotatable. It will be understood that a similar set of rollers is provided at the forward and rearward portion of the seat support 114 upon each side of the mechanism. The supporting web 114 has secured thereto, as by spot welding and adjacent its forward portion, a bracket 118 (see Figures 3 and 4). Bracket 118 has secured thereto a pair of ears 120 which are apertured to provide bearings for receiving a pin 122, one end of which terminates in a lever 124 adapted to be manually engaged for rotating the same, the opposite end of the pin 122 being retained within the ears 120 by means of a stop member 126 fast upon the pin 122. The pin 122 is encircled by a coil spring 128 having one end 130 in engagement with an upper portion of one of the ears 120, and the other end 132 engaged in a slot 134 formed in the lug 126.

Lug 126 is adapted to cooperate with one of a series of notches 136 formed in a plate 138 secured as by welding to the underside of the carriage guide 16. At its inner side the plate 138 has an upturned portion 140 to provide a bearing for the end of a shaft 142 which extends transversely of the device and has pinions 144 mounted upon its opposite ends. Pinions 144 are adapted to cooperate with slots 146 formed in a plate 148 to provide a rack. The plate 148 is secured by any suitable means such as welding to the underside of the seat support 114.

It will be recognized that the seat may be moved longitudinally of its support after retracting the lug 126 from its engagement with one of the slots 136 by lifting upwardly on the handle 124. The seat may be moved in either direction as desired by the occupant, and movement of one end will impart movement through the pinions 144, rack 146 and the shaft 142 to the opposite end, the axis of shaft 142 remaining fixed while the plates 146 are mutually moved. Location of the seat and retention in any desired position of longitudinal adjustment is accomplished simply by releasing the handle 124 which seats in any of the slots 136 to which it may be adjacent.

It will thus be seen that an adjuster has been provided which may be manipulated to move a seat to any desired location vertically or longitudinally of an automotive vehicle within a certain predetermined limit. It is contemplated that this limit will meet all requirements of variations in the side of parts of the human body which are met with in normal human beings. For example, if it is desired to accommodate the seat for supporting a driver having very long legs and a very short torso, it will be possible for him to adjust the seat by raising the elevating mechanism to lift the seat to its highest point and yet to retract the seat to its rearmost position so that there will be ample room for his legs.

A condition much more commonly encountered is a short legged individual with a relatively long torso. With the usual seat adjuster, such an individual would be uncomfortably high when the seat is adjusted to its forward position, as such seats are as a general rule elevated as they are moved forwardly. With the present adjuster a short legged, long waisted individual may adjust the elevating mechanism to its lowest point and the translating mechanism to its most forward point, thereby providing the maximum in comfort and accessibility of the various levers and pedals and the maximum of visibility and headroom.

It will also be recognized that the adjuster of the present invention has the additional advantages of being easily and cheaply constructed almost wholly of stamped metal parts, and that it may readily be employed and placed in position in an automotive vehicle without requiring any major alteration in the floor or in the seat construction.

While the invention has been described with considerable detail, this description is not to be taken as limiting but merely as illustrative. All equivalents falling within the scope of the attached claims are reserved.

It is claimed:

1. A vertical adjusting mechanism for a seat comprising a support for said seat, a plurality of toggle mechanisms extending between said support and said seat, means comprising a link connecting the knees of said toggles for constraining said toggle mechanisms to operate in unison, means comprising a second link pivoted between said support and said seat for constraining said seat to move in substantially vertical directions under the influence of said toggle mechanisms, a rock shaft journaled in said support and to which a portion of said toggle mechanism is rigidly attached for rotation therewith, and locking means cooperating with the rock shaft and a portion of said support to retain the rock shaft in any one of several adjusted positions.

2. A vertical adjustment for a seat comprising a base, toggle mechanism between each corner of said seat and said base, links connecting the knees of front and rear toggles to constrain said toggles to operate in unison, other links connecting said seat and said base constraining said seat to move along a generally vertical line, means for rotating one of the links of each of said forward toggles in unison including a rock shaft operatively connected to said links of said forward toggles, and means carried by and rotatable with said rock shaft and cooperable with a fixed segment concentric with the rock shaft axis for locking said rock shaft against rotation.

3. A seat adjuster comprising a support for a seat, toggles positioned one adjacent each corner of the seat and extending between the support and the seat, links connecting the knees of the forward and rear toggles adjacent each side of the seat, a link pivoted upon said support and to the seat to cause said seat to move in a substantially vertical direction under the action of said toggles, and means for rotating one of the links of a toggle at each side of the seat in unison with one another to straighten or break the toggle to elevate or lower the seat, said means including a rock shaft to which said links are fast and a spring connected thereto to rotate the same in a direction to straighten the toggle.

4. A seat adjuster comprising a support for a seat, a plurality of toggles extending between the support and the seat, links connecting the knees of said toggles together to cause them to operate in unison, a link connected between said support and said seat to cause said seat to move in a substantially vertical direction under the action of said toggles, means for rotating one of the links of one toggle to straighten or break the toggles and including a rock shaft to which said toggle link is fast, means urging said toggle link in a toggle straightening direction, and manually disconnectible means for locking said rock shaft against rotation.

5. An elevating seat construction comprising, a base, elevating mechanism having a rotatable rock shaft journaled in said base and links fast to said rock shaft, spring means urging said rock shaft into rotated position representing seat elevated position, means including a pin carried by said rock shaft and cooperating with a plurality of apertures in a quadrant fixed on said base for locking said rock shaft against rotation, and means urging said pin into seated relationship with said quadrant apertures.

6. Seat adjusting structure comprising adjusting mechanism having a hollow rock shaft rotatable to effect adjustment, means for lacking said rock shaft in one of several rotated positions including a pin located eccentrically with respect to said rock shaft and carried thereby, a quadrant provided with a series of pin-receiving apertures rigidly secured to said structure and arranged concentrically with the axis of said rock shaft, and manually movable means extending through the hollow center of said rock shaft and connected to said pin for retracting said locking pin to permit rotation of said rock shaft.

7. In a seat mounted upon a base for adjustment at a plurality of elevations and having toggle means for effecting said adjustment, means for locking said toggle means to secure said seat in any of a plurality of positions including a rock shaft journaled in said base and fixed in relation to said toggle means, a quadrant formed on said base and concentric with said rock shaft, an arm fixed to said rock shaft and adjacent said quadrant, a pin supported by said arm and engageable with said quadrant at a plurality of positions to lock said toggles, a link pivoted on said rock shaft and connected to said pin and an operating rod within said rock shaft connected to said link.

ARNOLD W. KAISER.
HERMAN C. RUSCH.